United States Patent
Wu et al.

(10) Patent No.: US 7,787,267 B2
(45) Date of Patent: Aug. 31, 2010

(54) ACTIVE POWER FILTER

(75) Inventors: Chin-Chang Wu, Kaohsiung (TW);
Hung-Liang Chou, Kaohsiung (TW);
Wen-Pin Hsu, Kaohsiung (TW);
Yu-Ting Kuo, Kaohsiung (TW);
Jiunn-Jye Yang, Kaohsiung (TW)

(73) Assignee: Ablerex Electronics Co., Ltd., Hsintien (TW)

( * ) Notice: Subject to any disclaimer, the term of this patent is extended or adjusted under 35 U.S.C. 154(b) by 307 days.

(21) Appl. No.: 11/845,822

(22) Filed: Aug. 28, 2007

(65) Prior Publication Data
US 2008/0219035 A1  Sep. 11, 2008

(30) Foreign Application Priority Data
Mar. 5, 2007  (TW) ............... 96107519 A (51) Int. Cl.
*H02M 1/10* (2006.01)
*H02M 1/12* (2006.01)
*H02M 1/44* (2007.01)

(52) U.S. Cl. .................. 363/39; 327/552; 307/105
(58) Field of Classification Search ........ 327/551–559; 363/39–48; 307/105
See application file for complete search history.

(56) References Cited

U.S. PATENT DOCUMENTS

| | | | | |
|---|---|---|---|---|
| 4,651,265 A | * | 3/1987 | Stacey et al. | 363/35 |
| 5,321,598 A | * | 6/1994 | Moran | 363/41 |
| 5,465,203 A | * | 11/1995 | Bhattacharya et al. | 363/40 |
| 5,498,994 A | * | 3/1996 | Furuta | 327/532 |
| 5,614,770 A | | 3/1997 | Suelzle | |
| 5,677,832 A | | 10/1997 | Tissier et al. | |
| 5,751,138 A | * | 5/1998 | Venkata et al. | 323/207 |
| 5,880,948 A | * | 3/1999 | Nachbauer | 363/95 |
| 5,977,660 A | | 11/1999 | Mandalakas et al. | |
| 6,075,350 A | * | 6/2000 | Peng | 323/207 |
| 6,882,549 B2 | * | 4/2005 | Huggett et al. | 363/40 |

* cited by examiner

*Primary Examiner*—Gary L Laxton
*Assistant Examiner*—Nusrat J Quddus
(74) *Attorney, Agent, or Firm*—Alan Kamrath; Kamrath & Associates PA (57) ABSTRACT

An active power filter includes an energy storage capacitor, an inverter, a filtering circuit and a controller. The inverter is controlled to act as a virtual resister at a fundamental frequency for compensating for the power loss of the active power filter, to act as a virtual capacitor at a fundamental frequency for compensating for a fundamental reactive power of the load, and/or to generate a harmonic current for suppressing the harmonic currents of specific orders of the load.

16 Claims, 10 Drawing Sheets

ACTIVE POWER FILTER

BACKGROUND OF THE INVENTION

1. Field of the Invention

The present invention relates to an active power filter. More particularly, the present invention relates to a parallel connection of an active power filter and a load for providing a selectable compensation from a fundamental reactive current, an attenuation of a compound of the harmonic currents of specific orders, and a combination of both of them, with the load being particularly a nonlinear load and with an attenuating ratio of the attenuation being adjustable.

2. Description of the Related Art

Recently, the characteristics of power electronic devices have improved significantly. The power electronic devices with characteristics of high-voltage rating, high-current rating, and high switching speed have been developed due to the improvement of semiconductor manufacturing technique. Power electronic devices are widely applied in electric power equipment, such as an uninterruptible power supply, a motor driver, an arc furnace, a trolley car, a battery charger, a lighting appliance, etc. The electric power equipment may generate a large amount of harmonic currents due to the nonlinear input characteristic of such loads. The harmonic current will pollute the power system and result in serious problems such as transformer overheat, rotary machine vibration, degrading voltage quality, electric power components destruction, medical facilities malfunction, etc. In order to improve the problems of harmonic pollution effectively, many harmonic control standards, such as IEEE519-1992, IEC1000-3-5, IEC1000-3-4, etc., have been established by international research centers.

Traditionally, a passive power filter configured by the inductor and capacitor was used to solve the problems caused by the harmonic pollution in a power system. However, the passive power filter may cause resonance and neighbor harmonic current injection problems that may damage the passive power filter. Additionally, it is quite hard to obtain better filtering performance of the passive power filter since the filter characteristic of the passive power filter may be affected by the system impedance.

Figure 1:
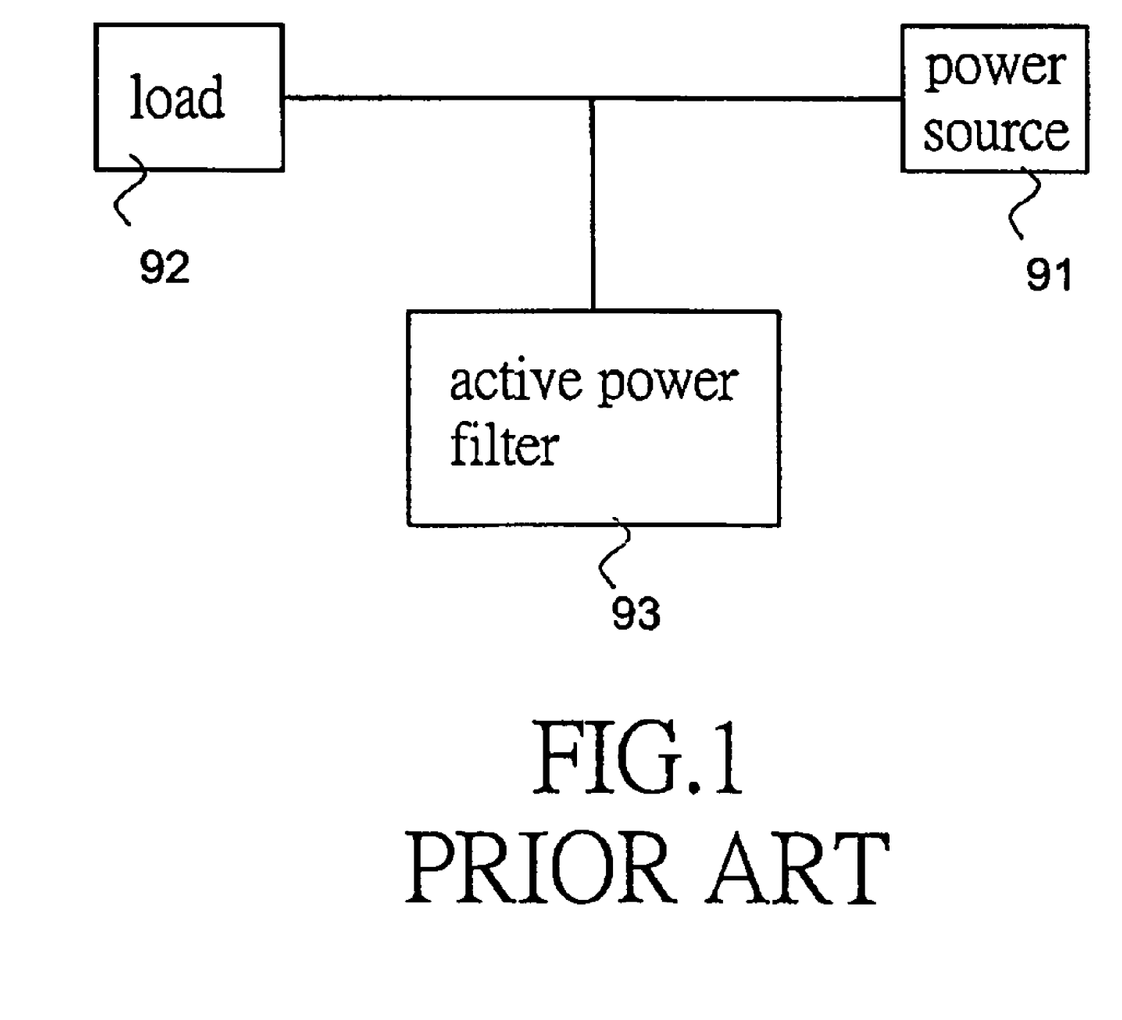
FIG. 1 is a schematic circuitry of a power system with a conventional active power filter.

Because of the mentioned drawbacks of the passive power filter, active power filters were developed for harmonic suppression recently, which have a conventional structure as shown in FIG. 1. A power source 91 provides a load 92 with electrical power, and an active power filter 93 connects with the load 92 in parallel for providing a compensating current. The compensating current is equal to the fundamental reactive current and the harmonic current of the load. Subsequently, the compensating current is injected into a power line between the power source 91 and the load 92 to suppress the harmonic current of the load 92 and improve the power factor simultaneously.

Figure 2:
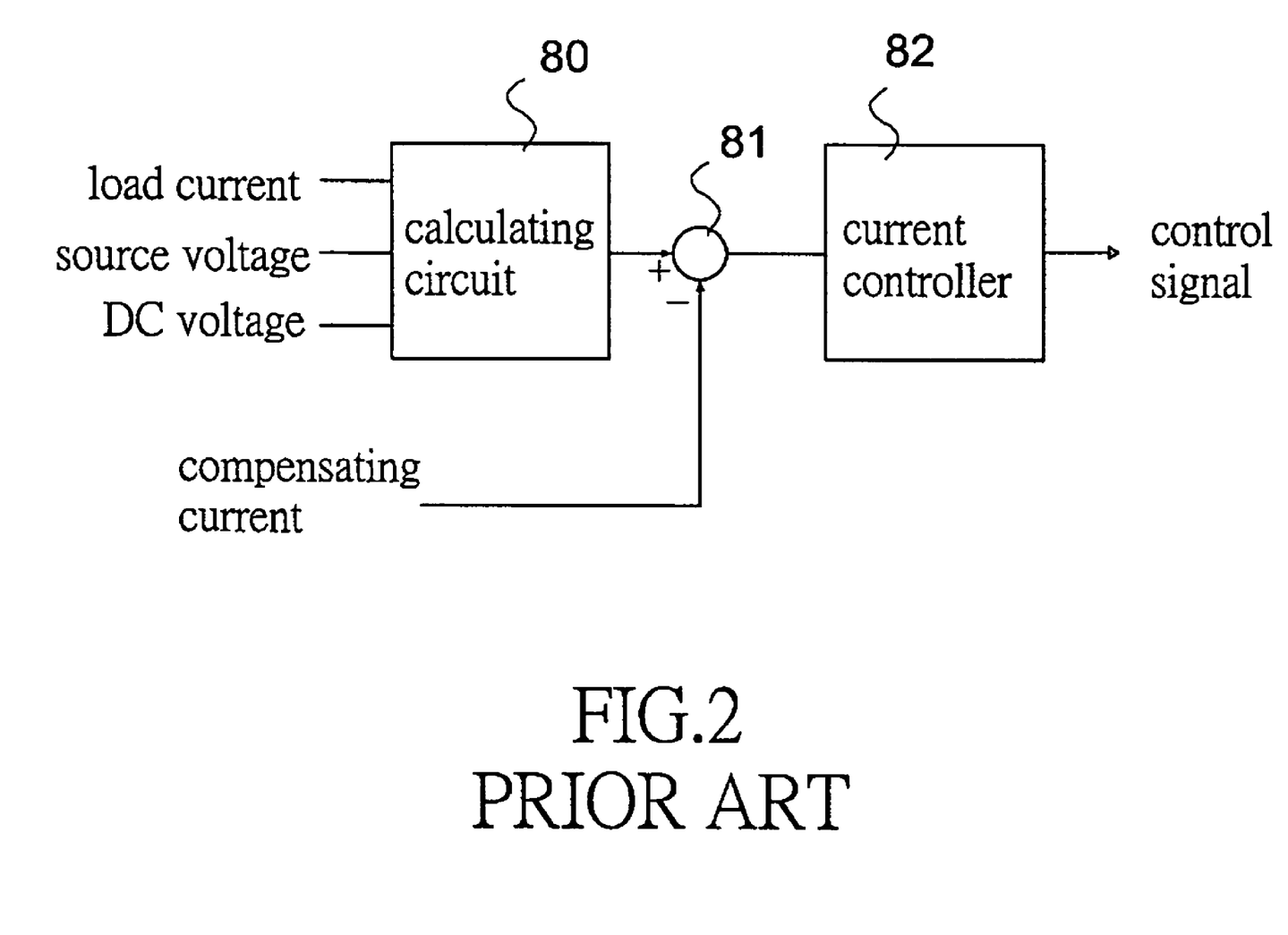
FIG. 2 is a schematic circuitry of a conventional active power filter.

The conventional active power filters disclosed in U.S. Pat. Nos. 5,677,832 and 5,614,770 with a control structure are shown in FIG. 2. A calculating circuit 80 detects a load current, a source voltage and a DC voltage of the active power filter for calculating a reference signal of compensating current. An output current of the active power filter is detected and subtracted from the reference signal of compensating current by a subtracter 81, and the subtracting result is transmitted to a current controller 82 to generate a control signal. Although the conventional active power filter is able to suppress the harmonic current and improve the power factor, there are still some disadvantages as follows:

1. a conversion ratio of a current sensor for the load current and that for the output current of the active power filter should be pre-known. Otherwise, the compensation performance of the active power filter will be degraded due to the mismatch of the compensating current of the active power filter and the harmonic current of the load; and 2. a generated compensating current includes the harmonic currents composed of all orders and the fundamental reactive current, which results in an application limitation in some applications.

A direct source current compensation method disclosed in "Simplified control method for the single phase active power filter," IEE Proc. Electrical Power Applications, vol.143, 1996, pp. 219-224 was proposed to solve the first disadvantage above. Nevertheless, its compensating current still includes the harmonic currents composed of all orders and the fundamental reactive current.

Although an active power filter disclosed in U.S. Pat. No. 5,977,660 senses the source current to calculate a reference signal of a compensating current thereby, the generated compensating current still suppresses the harmonic currents of all orders and compensates the fundamental reactive current simultaneously. In addition, microprocessors are generally used to implement the controllers of conventional active power filters. Since the fundamental component dominates the source current after compensating by the active power filter, the harmonic components are too small to be detected from the source current. Especially due to the bits limitations in A/D converters of microprocessor, an evident error will appear in the calculation of reference signal of compensating current for the active power filter. An inaccurate compensating current resulting from the above reasons will degrade the filtering performance of the active power filter.

The present invention provides an active power filter without those disadvantages of the conventional ones. The control method of the active power filter detects a source current, a source voltage and an energy storage capacitor voltage of the active power filter to calculate a reference signal of compensating current. The reference signal of compensating current can be set manually to select as a fundamental reactive current, an attenuation of a compound of the harmonic currents of specific orders, and a combination of both of them. Moreover, an attenuating ratio of harmonic currents of each specified orders is adjustable individually. For improving the accuracy in the calculation of reference signal of compensating current, the detected source current is separated into two parts before transmitting to a microprocessor for calculating a reference signal of compensating current. One is the source current itself, and the other part is the combination of all harmonic components. Furthermore, the control method also operates the active power filter as a parallel operation of a virtual resister and a virtual capacitor at the fundamental frequency to compensate for the fundamental reactive power of the load and the power loss of the active power filter.

SUMMARY OF THE INVENTION

The primary objective of this invention is to provide an active power filter utilizing a controller operating an inverter to generate a compensating current injecting into a power line connected between a power source and a load. Consequently, the present invention effectively suppresses the harmonic currents and/or improves the power factor.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given herein below and the accompanying drawings which are given by way of illustration only and, thus, are not limitative of the present invention, and wherein.

DETAILED DESCRIPTION OF THE INVENTION

Figure 3:
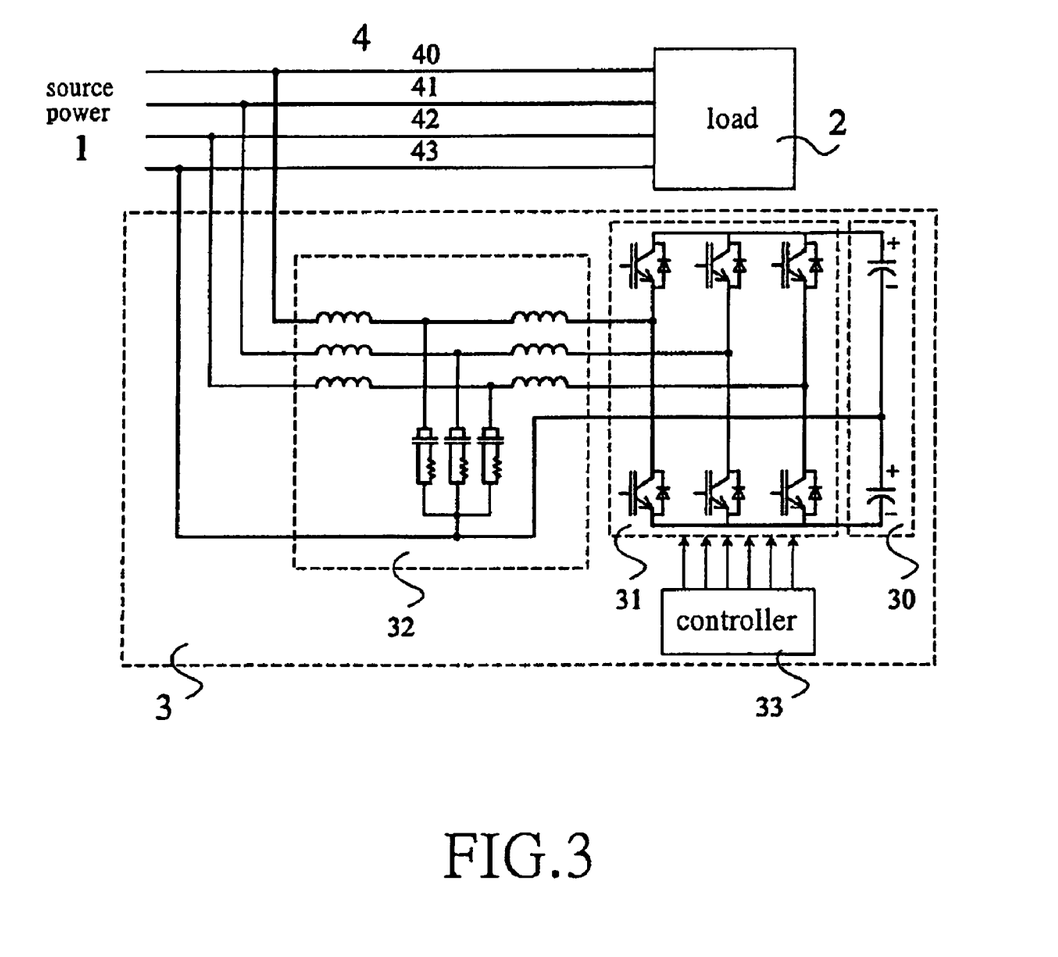
FIG. 3 is a schematic circuitry of a power system with an active power filter in accordance with a first embodiment of the present invention.

Referring to FIG. 3, a schematic circuitry of a power system with an active power filter in accordance with a first embodiment of the present invention is illustrated. The active power filter 3 is applied in a three-phase four-wire power system that further includes a power source 1, a load 2, and a power line set 4. The power source 1 is a three-phase four-wire AC power source and supplies the load 2 with electrical power through the power line set 4 comprising three power lines 40, 41, 42 for the three phases respectively and a neutral line 43. The active power filter 3 electrically connects to the power line set between the power source 1 and the load 2.

Still referring to FIG. 3, the active power filter 3 comprises an energy storage capacitor 30, an inverter 31, a filtering circuit 32, and a controller 33. The energy storage capacitor 30 provides a regulated DC voltage and includes two serially connecting DC capacitors. The connected point of the two DC capacitors connects to the neutral capacitors. The connected point of the two DC capacitors connects to the neutral line 43. The inverter 31 electrically connects to two terminals of the energy storage capacitor 30. The inverter is a three arm bridge structure with split DC capacitors. The three arm bridge structure includes six power electronic switches. In operation, switching the power electronic switches of the inverter 31 converts the DC voltage of the energy storage capacitor 30 into a compensating voltage. The filtering circuit 32 has two sets of terminals with one of them electrically connecting to the inverter 31 and the other of them connecting to the three power lines 40, 41, 42 between the power source 1 and the load 2. The filtering circuit 32 comprises a plurality of inductors, capacitors and resisters and acts as a low pass filter to filter the ripples due to the high-frequency switching of the inverter 31. Through the filtering circuit 32, the compensating voltage generated by the inverter 31 converts into a compensating current. The compensating current is injected into the power line set 4 for compensating for the power loss of the active power filter and for selectively compensating the load 2 for a compound of the harmonic currents of specific orders and/or a fundamental reactive current. Consequently, the harmonic current of the source current is suppressed, and/or the power factor is improved.

Figure 4:
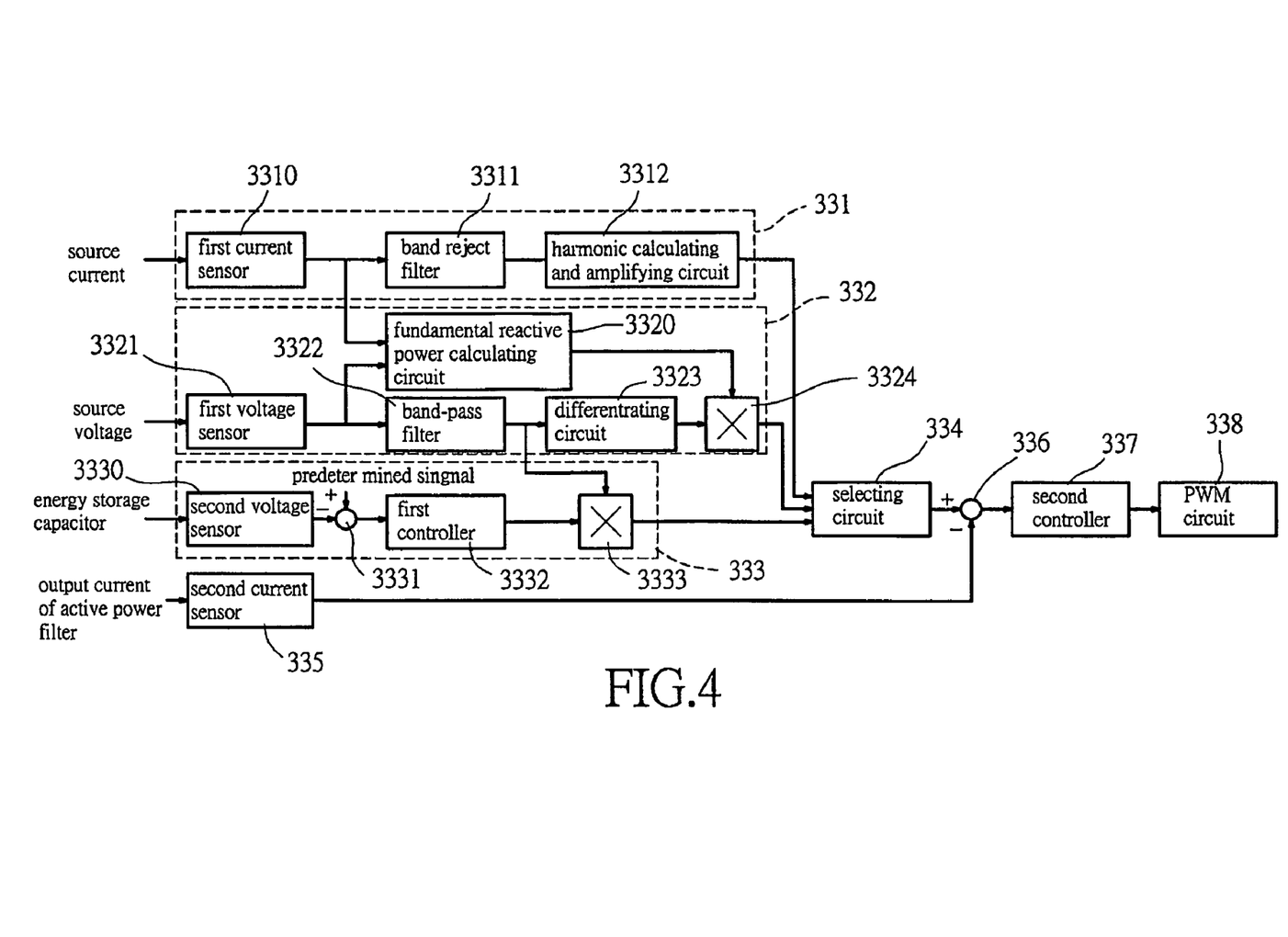
FIG. 4 is a schematic circuitry of a controller of the active power filter in accordance with a first embodiment of the present invention.

Referring to FIG. 4, a schematic circuitry of the controller 33 of the active power filter 3 in accordance with a first embodiment of the present invention is illustrated, with the inverter 31 being in a current-mode control. The controller 33 comprises a harmonic current loop 331, a fundamental reactive current loop 332 and a fundamental real current loop 333. A reference signal Ir* of the compensating current is obtained through the three circuits 331, 332, 333, and an output current of the active power filter 3 is detected. As a result, control signals for the inverter 31 are produced by utilizing the controller 33 completing a feedback control with the reference signal Ir* and the output current of the active power filter 3, so that the output current of the active power filter 3 can track the reference signal Ir*.

Still referring to FIG. 4, firstly, the harmonic current loop 331 of the controller 33 of the active power filter 3 is used to obtain a harmonic component of the reference signal Ir*. The harmonic current loop 331 comprises a first current sensor 3310, a band-rejection filter 3311 and a harmonic calculating and amplifying circuit 3312. The first current sensor 3310 detects the source current, and its output signal is transmitted to the band-rejection filter 3311 to filter out the fundamental component of the source current. The harmonic calculating and amplifying circuit 3312 receives the output of the band-rejection filter 3311 and calculates the harmonic components of each of the specified orders and then amplifies them by different gains in accordance with the preset attenuation ratio. It should be noticed that the band-rejection filter 3311 must be realized by an analog circuit, and the harmonic calculating and amplifying circuit 3312 can be realized by a microprocessor. Since the fundamental component is the dominated component of the source current after compensating by the active power filter, the harmonic components are too small to be detected from the source current. Especially for the harmonic calculating and amplifying circuit 3312 being implemented by a microprocessor with limited bits of A/D converters, an evident error will appear in calculating the compensating components. This is the reason why such a band-rejection filter 3311 in the harmonic current loop 331 to filter out the fundamental component of the source current for emphasizing the harmonic component must be realized by an analog circuit. Hence, the accuracy of harmonic components calculation is improved.

One method to detect the source current is directly sensing it by using a current sensor at the power source 1. The other method to detect the source current is by using the current sensor at the load 2 to detect a current of the load 2 and calculating the source current by using the current of the load 2 and the output current of the active power filter 3.

Figure 5:
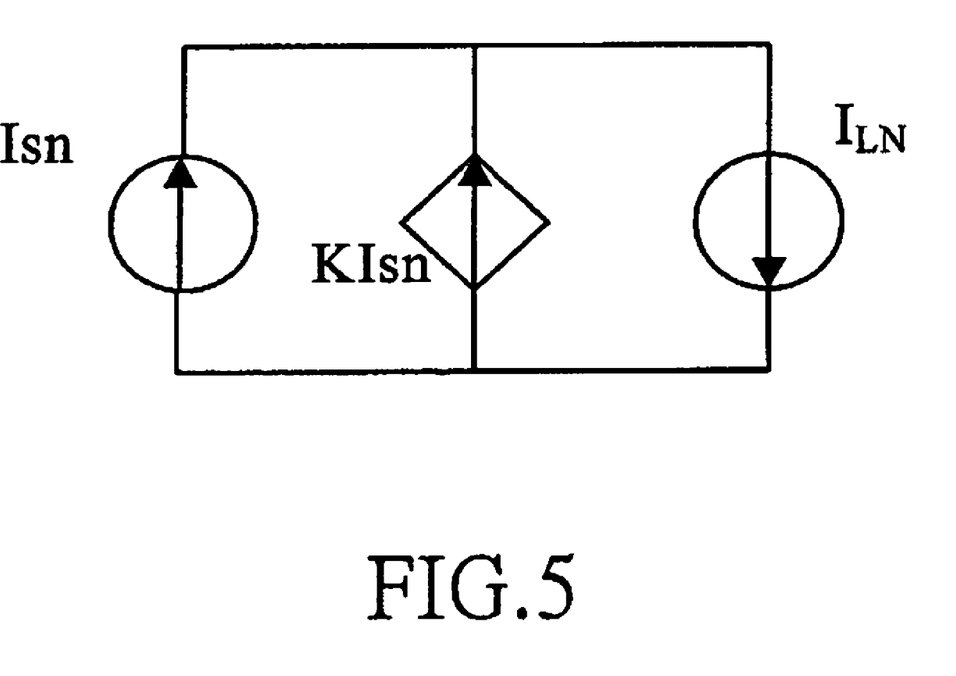
FIG. 5 is an equivalent circuit of the power system of an nth harmonic order in accordance with the first embodiment of the present invention.

Referring to 5, an equivalent circuit of the system shown in FIG. 3 under the nth harmonic frequency is illustrated. The active power filter 3 can be regarded as a dependent current source due to the use of the current-mode control of the inverter 31. The nth-order harmonic current of the load 2 is labeled as ILn, and the nth-order harmonic current of the power source 1 is labeled as Isn. The inverter 31 generates a nth-order harmonic current KIsn injected into the power line set 4, with K represented as an amplification gain of the harmonic calculating and amplifying circuit 3312. By using the Kirchhoff's rule, an equation as the following one is obtained.

$$I_{sn} = \frac{1}{K+1} I_{Ln} \qquad (1)$$

According to the above equation (1), the amplification gain K determines the attenuating ratio of the $n^{th}$-order harmonic current. Therefore, while being applied to the harmonic current in specified order, the harmonic calculating and amplifying circuit 3312 not only obtains the harmonic components of each specified order but also determines the attenuating ratio thereof. Consequently, the output of the harmonic calculating and amplifying circuit 3312 is the harmonic component of the reference signal $I_r^*$.

Still referring to FIG. 4, the fundamental reactive current loop 332 of the controller 33 for the active power filter 3 is used to obtain a fundamental reactive component of the reference signal Ir*. Due to the current-mode control applied to the inverter 31, a current of a capacitor is shown as the follows:

$$i_c = C \frac{dV}{dt} \qquad (2)$$

where V is the voltage of power source 1. By using the fundamental reactive current loop 332 to control the inverter 31, the compensating current generated by the active power filter 3 comprises a component proportional to a differential value of the fundamental voltage of the power source 1. As a result, the active power filter 3 acts as a virtual capacitor C at the fundamental frequency and connects in parallel to the power source 1 for generating a reactive power to compensate the load 2. Please note that the active power filter 3 acts as a virtual capacitor only at the fundamental frequency to avoid resulting in a harmonic pollution.

Furthermore, the fundamental reactive current loop 332 comprises a fundamental reactive power calculating circuit 3320, a first voltage sensor 3321, a band-pass filter 3322, a differentiating circuit 3323 and a first multiplier 3324. In order to determine a value of the virtual capacitor for the required compensating reactive power of the active power filter 3, the first voltage sensor 3321 senses the source voltage. The sensed source voltage and the output of the first current sensor 3310 are transmitted to the fundamental reactive power calculating circuit 3320 to calculate the fundamental reactive power. Meanwhile, the signal sensed by the first voltage sensor 3321 is also transmitted to the band-pass filter 3322 to obtain a fundamental voltage of the power source 1. Continuously, the output of the band-pass filter 3322 is transmitted to the differentiating circuit 3323 to generate a differential signal of the fundamental voltage of the power source 1. Then, the outputs of the fundamental reactive power calculating circuit 3320 and the differentiating circuit 3323 are transmitted to the first multiplier 3324 to generate the fundamental reactive component of the reference signal $I_r^*$.

Thirdly, the fundamental real current loop 333 is employed for obtaining a fundamental real component of the reference signal Ir*. Due to the current-mode control applied to the inverter 31, the current of the virtual resistor is shown as follows:

$$i_R = \frac{V}{R} \qquad (3)$$

Through the inverter 31, the fundamental real current loop 333 enables the active power filter 3 to generate a compensating current comprising a component proportional to the fundamental voltage of the power source 1 shown as Eq. (3). Therefore, the active power filter 3 acts as a virtual resistor R at the fundamental frequency and connects to the power source 1 in parallel to absorb a real power, so as to compensate for the power loss of the active power filter 3 and maintain the regulated DC voltage level supplied by the energy storage capacitor 30. It should be noticed that the active power filter 3 only acts as a virtual resistor at the fundamental frequency to avoid resulting in a harmonic pollution.

Furthermore, the fundamental real current loop 333 comprises a second voltage sensor 3330, a first subtracter 3331, a first controller 3332 and a second multiplier 3333. The second voltage sensor 3330 detects the voltage of the energy storage capacitor 30 and sends a signal to the first subtracter 3331 to compare with a predetermined signal. The predetermined signal is used to determine the desired voltage of the energy storage capacitor 30. The output of the first subtracter 3331 is transmitted to the first controller 3332 for determining a value of the virtual resistor at the fundamental frequency. Then, the outputs of the first controller 3332 and the band-pass filter 3322 are transmitted to the second multiplier 3333 to generate the fundamental real component of the reference signal Ir*.

Finally, the fundamental reactive component generated by the fundamental reactive current loop 332, the fundamental real component generated by the fundamental real current loop 333 and the harmonic component generated by the harmonic current loop 331 are transmitted to a selecting circuit 334. The selecting circuit 334 selects the reference signal Ir* from the combination of the above three components. The combination is shown as follows:

1. the reference signal Ir* is the fundamental real component and the fundamental reactive component together to compensate for the fundamental reactive power of the load 2;

2. the reference signal Ir* is the real fundamental component and the harmonic component together to suppress the harmonic currents of specific orders of the load 2; and 3. the reference signal Ir* is all of the harmonic component, the fundamental reactive component and the fundamental real component, in order to compensate for the fundamental reactive power and for suppressing the harmonic currents of specific orders of the load 2 simultaneously.

Still referring to FIG. 4, a second current sensor 335 detects the output current of the active power filter 3, and the output of the second current sensor 335 is sent to a second subtracter 336 to compare with the reference signal Ir*. The output of the second subtracter 336 is transmitted to a second controller 337. The output of the second controller 337 is sent to a pulse-width modulation (PWM) circuit 338, so as to generate control signals for the power electronic switches of the inverter 31. With the close loop control system of the present invention, the output current of the active power filter 3 can track the reference signal Ir*. The compensating current generated by the active power filter 3 is injected into the power line set 4.

The described compensating current is the fundamental real component outputted by the fundamental real current loop 333 adding a selectable compensation function from the combination of the fundamental reactive component outputted by the fundamental reactive current loop 332 and/or the harmonic component outputted by the harmonic current loop 331. The inverter has the compensating current including the fundamental real current component making the active power filter 3 equal to a circuit having a virtual resistor, and the inverter has the compensating current including the fundamental reactive current component making the active power filter 3 equal to a circuit having a virtual capacitor. The inverter has the compensating current including the harmonic current component making the active power filter 3 to attenuate a compound of the harmonic currents of specific orders with a predetermined attenuating ratio set by the user.

Figure 6:
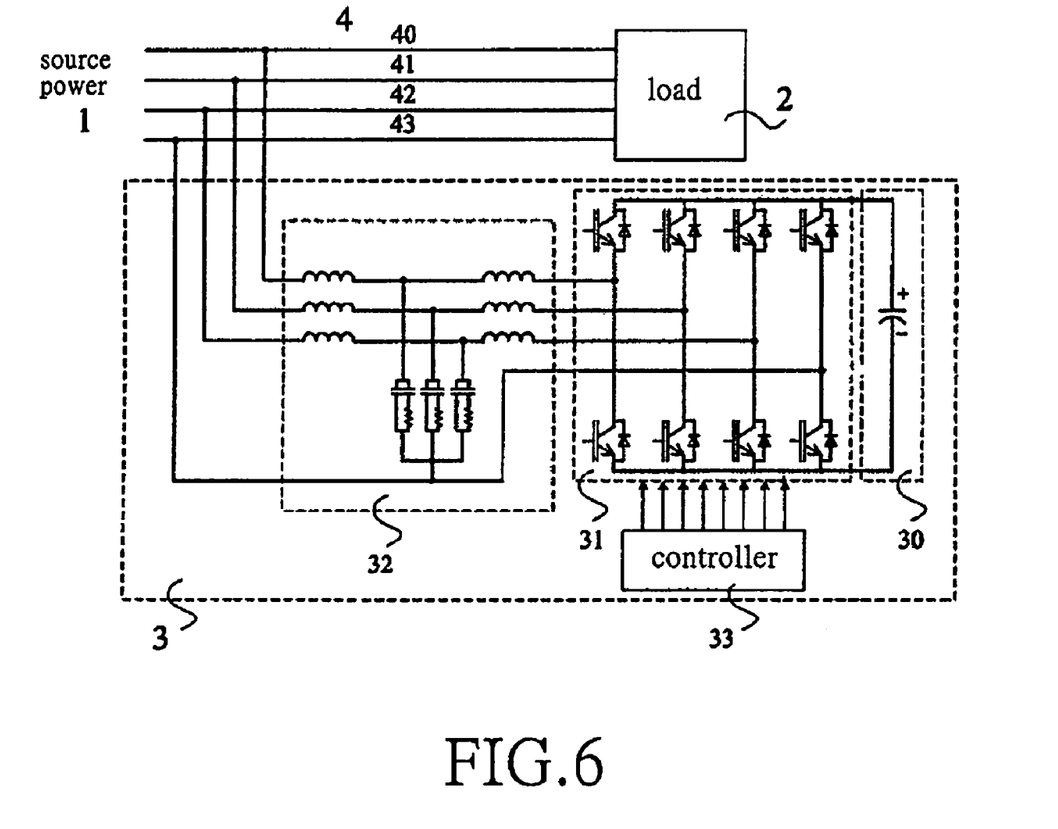
FIG. 6 is a schematic circuitry of a power system with an active power filter in accordance with a second embodiment of the present invention.

Referring to FIG. 6, a schematic circuitry of the active power filter 3 in accordance with a second embodiment of the presented invention is illustrated. In comparison with the first embodiment, the inverter 31 of the second embodiment is configured by a four arms bridge structure, each arm is consisted of two series connected power electronic switches, and the neutral line 43 connects to a middle connected point of two series connected power electronic switches in one of the four arms. Additionally, the energy storage capacitor 30 has only one DC capacitor.

Figure 7:
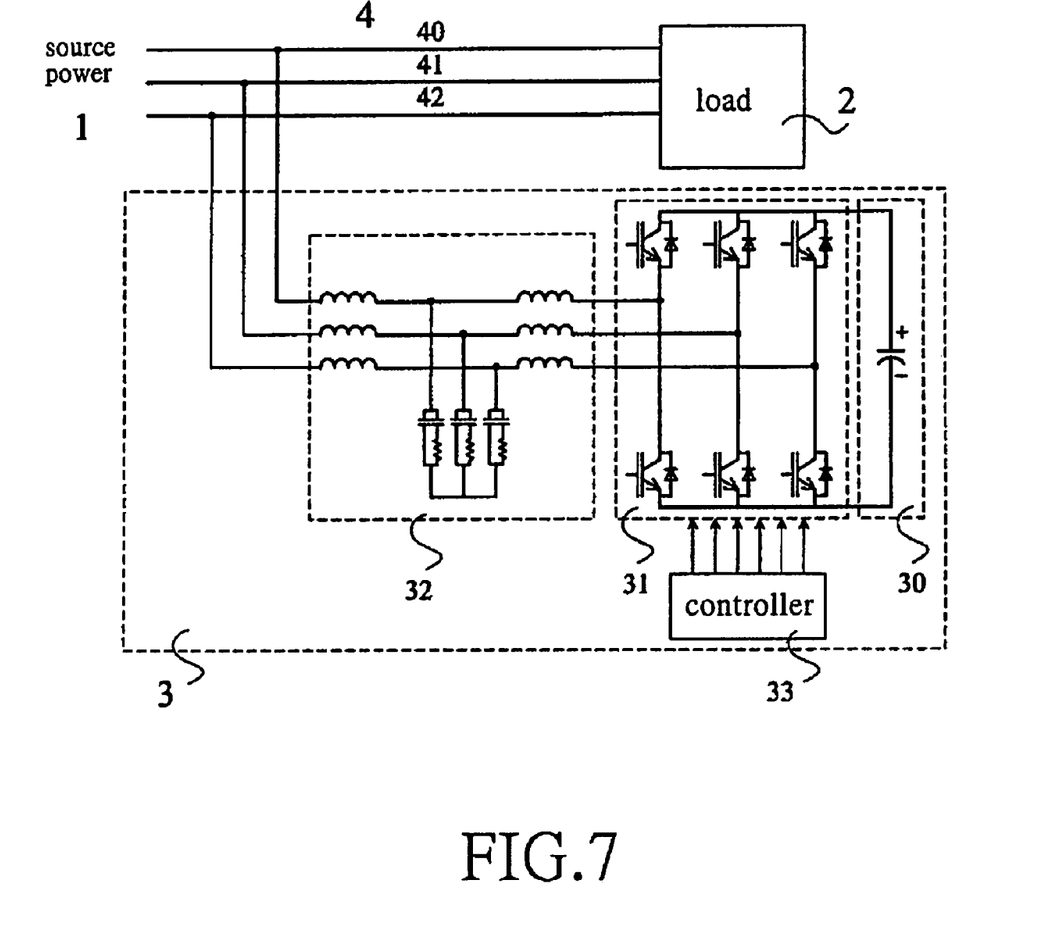
FIG. 7 is a schematic circuitry of a power system with an active power filter in accordance with a third embodiment of the present invention.

Referring to FIG. 7, a schematic circuitry of the active power filter 3 in accordance with a third embodiment of the present invention is illustrated. In comparison with the second embodiment, the active power filter 3 is applied to a three-phase three-wire power system, with the power source 1 being a three-phase three-wire AC power source and supplying the load 2 with a three-phase electrical power through the power line set 4. In comparison with the second embodiment, the inverter 31 of the third embodiment is configured by a three arm bridge structure, and each arm is two series connected power electronic switches.

Figure 8:
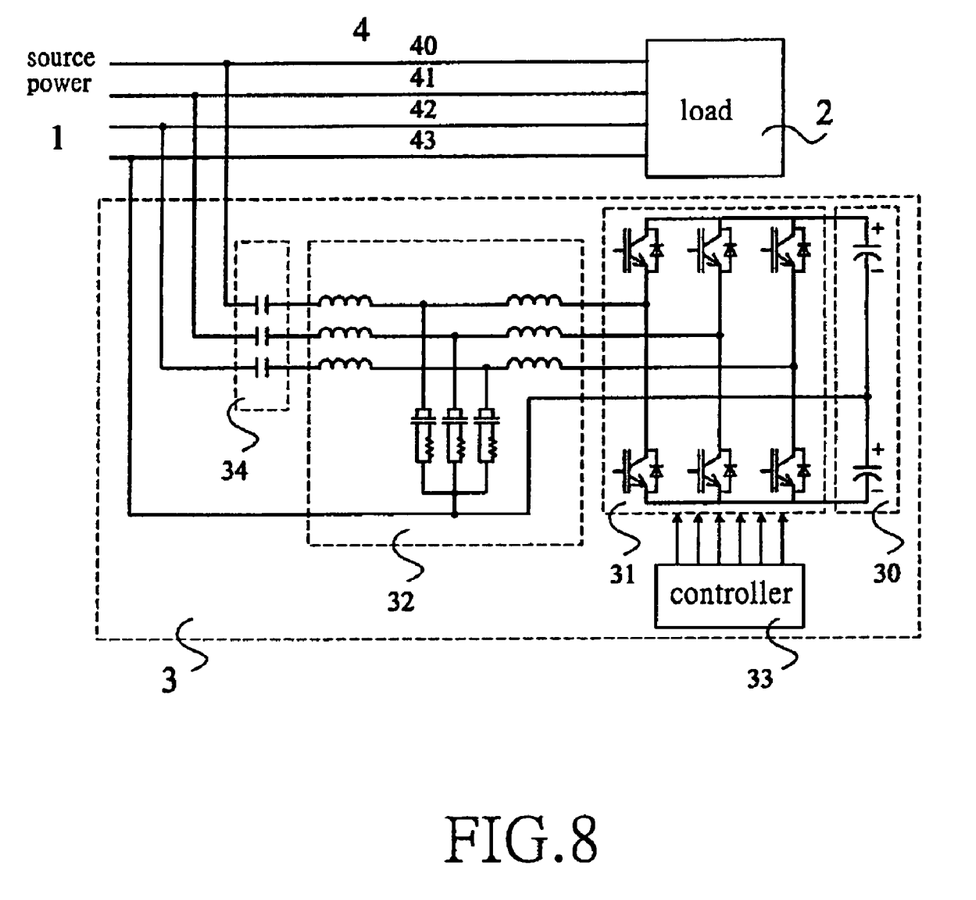
FIG. 8 is a schematic circuitry of a power system with an active power filter in accordance with a fourth embodiment of the present invention.

Referring to FIG. 8, a schematic circuitry of the active power filter 3 in accordance with a fourth embodiment of the present invention is illustrated. In comparison with the first through third embodiments, the active power filter 3 is applied to a three-phase four-wire power system of the power source 1 being a high level AC power source. Particularly, being different from the active power filter 3 disclosed by the first embodiment, an AC power capacitor 34 is employed to serially connect between the filtering circuit 32 and the three power lines 40, 41, 42. This AC power capacitor 34 supplies an additional reactive power and blocks most of the fundamental voltage of the power source 1 while the active power filter 3 is applied in the power system with a higher voltage level. Additionally, the fundamental reactive current loop 332 of the controller 33 only requires to set a low limited value, and it can reduce the capacity of the inverter 31 used in the active power filter 3.

Figure 9:
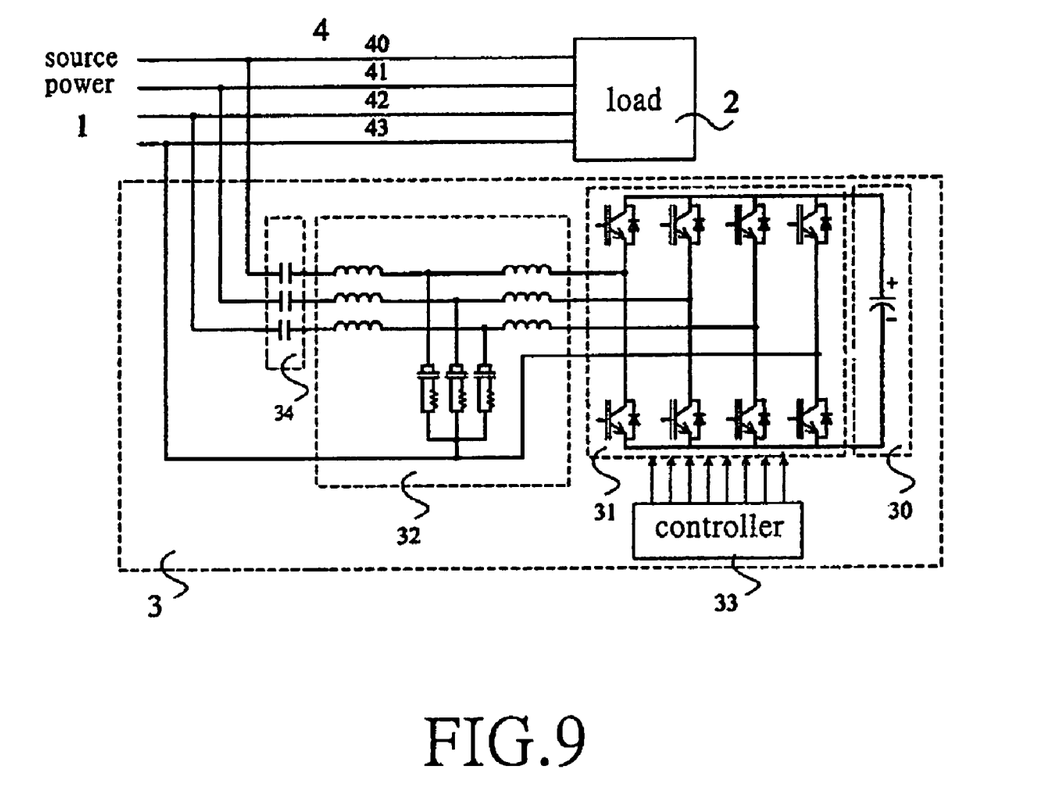
FIG. 9 is a schematic circuitry of a power system with an active power filter in accordance with a fifth embodiment of the present invention.

Referring to FIG. 9, a schematic circuitry of the active power filter 3 in accordance with a fifth embodiment of the present invention is illustrated. In comparison with the fourth embodiment, the inverter 31 of the fifth embodiment can also be configured by a four arm bridge structure, and each arm is two series connected power electronic switches, and the neutral line 43 connects to a middle connected point of two series connected power electronic switches in one of the four arms. Additionally, the energy storage capacitor 30 has only one DC capacitor.

Figure 10:
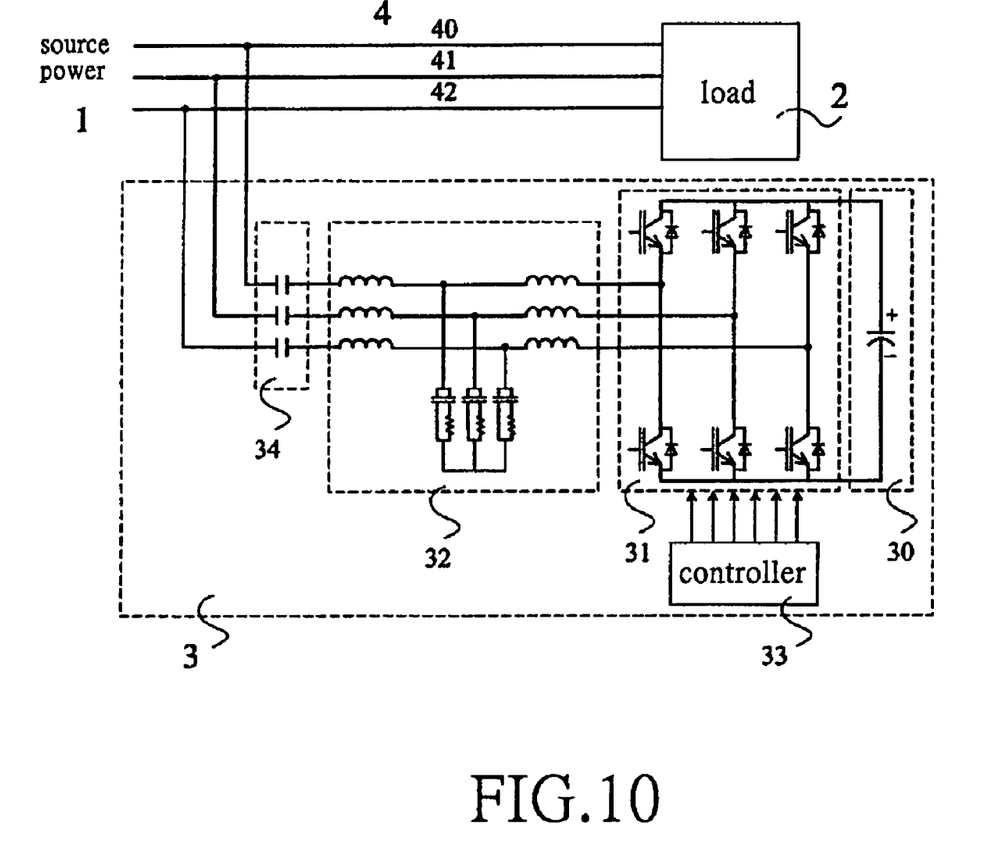
FIG. 10 is a schematic circuitry of a power system with an active power filter in accordance with a sixth embodiment of the present invention.

Referring to FIG. 10, a schematic circuitry of the active power filter 3 in accordance with a sixth embodiment of the present invention is illustrated. In comparison with the fifth embodiment, the active power filter 3 is applied to a three-phase three-wire power system of the power source 1 being a high level AC power source. Furthermore, being different from the active power filter 3 disclosed by the fifth embodiment, the inverter 31 of the sixth embodiment is configured by a three arm bridge structure, and each arm is two series connected power electronic switches.

Although the invention has been described in detail with reference to its presentedly preferred embodiments, it will be understood by one of ordinary skill in the art that various modifications can be made without departing from the spirit and the scope of the invention, as set forth in the appended claims.

What is claimed is:

1. An active power filter, comprising:
   an energy storage capacitor providing a regulated DC voltage;
   an inverter including a plurality of power electronic switches, with the inverter electrically connecting with two terminals of the energy storage capacitor for switching the regulated DC voltage;
   a filtering circuit providing two sets of terminals with one of the two sets electrically connecting to the inverter and another of the two sets electrically connecting to power lines between a power source and a load; and
   a controller outputting control signals transmitted to the inverter for driving the power electronic switches;
   wherein the controller detects a source current, a source voltage and an energy storage capacitor voltage for calculating a reference signal and detects an output current tracking the reference signal through a feedback control of the controller, so as to control the power electronic switches of the inverter generating a compensating current;
   wherein the controller further comprises a harmonic current loop having a first current sensor, a band-rejection filter and a harmonic calculating and amplifying circuit, with the first current sensor detecting the source current and transmitting a signal through the band-rejection filter to filter out the signal of a fundamental component, the harmonic calculating and amplifying circuit receiving an output of the band-rejection filter to calculate the harmonic component of each specified order and then amplifying the harmonic component of each specified order by different gains to form a part of the reference signal;
   wherein the compensating current comprises the harmonic components of specific assigned orders to attenuate a compound of the harmonic currents of specific orders with a predetermined attenuating ratio.

2. The active power filter as defined in claim 1, wherein the compensating current comprises a component being proportional to a fundamental voltage of the power source for controlling the active power filter acting as a virtual resistor at a fundamental frequency and connecting with the power source in parallel to compensate for power loss.

3. The active power filter as defined in claim 1, wherein the compensating current comprises a component being proportional to a differential value of the fundamental voltage of the power source for controlling the active power filter acting as a virtual capacitor at a fundamental frequency and connecting with the power source in parallel to compensate for the fundament reactive power of the load and the power loss.

4. The active power filter as defined in claim 1, wherein the controller further comprises a fundamental reactive current loop and a fundamental real current loop.

5. The active power filter as defined in claim 4 further comprising a current sensor detecting a current of the load and calculating the source current by the current of the load and the output current.

6. The active power filter as defined in claim 4, wherein the fundamental reactive current loop comprises a fundamental reactive power calculating circuit, a first voltage sensor, a band-pass filter, a differentiating circuit and a first multiplier, with the first voltage sensor sensing the source voltage, and output signals of the first voltage sensor and the first current sensor transmitted to the fundamental reactive power calculating circuit for calculating a value of a virtual capacitor of the inverter, with a signal generated by the first voltage sensor being transmitted to the band-pass filter to obtain a fundamental voltage of the power source, with output signals of the fundamental reactive power calculating circuit and the differentiating circuit are transmitted to the first multiplier to generate a signal proportional to a differential value of the fundamental voltage of the power source.

7. The active power filter as defined in claim 4, wherein the fundamental real current loop comprises a second voltage sensor, a first subtracter, a first controller and a second multiplier, with the second voltage sensor detecting an energy storage capacitor voltage and sending a signal to the first subtracter together with a predetermined signal, with an output of the first subtracter being transmitted to the first controller for setting a value of a virtual resistor of the inverter, with outputs of the first controller and a band-pass filter transmitted to the second multiplier to obtain a fundamental voltage of the power source to generate a signal proportional to a fundamental voltage of the power source.

8. The active power filter as defined in claim 4, wherein the controller further comprises a selecting circuit selecting a reference signal from a combination from outputs of the harmonic current loop, the fundamental reactive current loop and the fundamental real current loop.

9. The active power filter as defined in claim 8, wherein the selecting circuit selects the combination by adding the outputs of the fundamental reactive current loop and the fundamental real current loop together to compensate for a fundamental reactive power of the load.

10. The active power filter as defined in claim 8, wherein the selecting circuit selects the combination by adding the outputs of the fundamental real current loop and the harmonic current loop together to suppress harmonic currents of specific orders of the load.

11. The active power filter as defined in claim 8, wherein the selecting circuit selects the combination by adding the outputs of the harmonic current loop, the fundamental reactive current loop and the fundamental real current loop together to compensate a fundamental reactive power and suppress harmonic currents of specific orders of the load.

12. The active power filter as defined in claim 4, wherein the controller further comprises a second current sensor, a second subtracter, a second controller and a pulse width modulation (PWM) circuit, with the second current sensor detecting an output current of the active power filter, with outputs of the second current sensor and the reference signal transmitted to the second subtracter, with an output of the second subtracter transmitted to the second controller, and with an output of the second controller sent to the PWM circuit, so as to generate control signals for the plurality of power electronic switches within the inverter.

13. The active power filter as defined in claim 1, wherein applying the active power filter to a three-phase four-wire power system, the inverter is configured by a three arm bridge structure, wherein each arm consists of two series connected power electronic switches, with the energy storage capacitor being formed by two serially connecting DC capacitors.

14. The active power filter as defined in claim 1, wherein applying the active power filter to a three-phase four-wire power system, the inverter is configured by a four arm bridge structure, and wherein each arm consists of two series connected power electronic switches, with the energy storage capacitor being formed by a single DC capacitor.

15. The active power filter as defined in claim 1, wherein applying the active power filter to a three-phase three-wire power system, the inverter is configured by a three arm bridge structure, and wherein each arm consists of two series connected power electronic switches, with the energy storage capacitor being formed by a single DC capacitor.

16. The active power filter as defined in claim 1, further comprising an AC power capacitor connected with the filtering circuit in series and linked with power lines for applying to the power source with a higher voltage level.

* * * * *